(12) United States Patent
Yokoi

(10) Patent No.: US 8,546,040 B2
(45) Date of Patent: Oct. 1, 2013

(54) FUEL CELL

(75) Inventor: Akiyoshi Yokoi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 441 days.

(21) Appl. No.: 12/293,446

(22) PCT Filed: Dec. 5, 2007

(86) PCT No.: PCT/JP2007/073889
§ 371 (c)(1),
(2), (4) Date: Sep. 18, 2008

(87) PCT Pub. No.: WO2008/072642
PCT Pub. Date: Jun. 19, 2008

(65) Prior Publication Data
US 2009/0274946 A1    Nov. 5, 2009

(30) Foreign Application Priority Data
Dec. 7, 2006 (JP) .................................. 2006-330262

(51) Int. Cl.
*H01M 2/20* (2006.01)
*H01M 8/24* (2006.01)

(52) U.S. Cl.
USPC ........... 429/469; 429/456; 429/457; 429/467; 429/470; 429/480; 429/481; 429/507; 429/508

(58) Field of Classification Search
USPC ................. 429/454, 456, 457, 458, 463, 469, 429/470, 480, 507, 508, 509, 510, 514
See application file for complete search history.

(56) References Cited

U.S. PATENT DOCUMENTS

| | | | |
|---|---|---|---|
| 5,514,486 A * | 5/1996 | Wilson ........................... | 429/457 |
| 5,709,961 A * | 1/1998 | Cisar et al. ..................... | 429/455 |
| 5,976,726 A | 11/1999 | Wilkinson et al. | |
| 6,350,538 B1 | 2/2002 | Wilkinson et al. | |
| 6,773,843 B2 | 8/2004 | Kitagawa et al. | |
| 6,835,477 B1 | 12/2004 | Brambilla et al. | |

(Continued)

FOREIGN PATENT DOCUMENTS

| | | |
|---|---|---|
| CN | 1347575 A | 5/2002 |
| JP | 6-068884 A | 3/1994 |

(Continued)

OTHER PUBLICATIONS

Office Action in Japanese Application No. 2006-330262 (Sep. 20, 2012).

*Primary Examiner* — Basia Ridley
*Assistant Examiner* — Heng Chan
(74) *Attorney, Agent, or Firm* — Fitzpatrick, Cella, Harper & Scinto

(57) ABSTRACT

In forming a fuel cell stack by stacking a plurality of fuel cell units, in order to provide a fuel cell in which the fuel cell stack can be stably bound, the supply of fuel and conduction of respective cells can be surely performed, and stable power generation is possible, the fuel cell includes a fuel cell stack 2 formed by stacking a plurality of fuel cell units 3 having a fuel electrode 33 and an oxidizer electrode 43. The oxidizer electrode has, in a plane orthogonal to a stacking direction of the fuel cell units, an elastic member (an oxidizer electrode diffusion layer) 41 that is arranged in parallel to a rigid supporting member 14 and has electrical conductivity.

9 Claims, 9 Drawing Sheets

(56) References Cited

U.S. PATENT DOCUMENTS

| | | | |
|---|---|---|---|
| 6,974,647 B2 | 12/2005 | Wilkinson et al. | |
| 6,986,961 B1 * | 1/2006 | Ren et al. | 429/457 |
| 2002/0094470 A1 | 7/2002 | Wilkinson et al. | |
| 2003/0003342 A1 | 1/2003 | Sugita et al. | |
| 2007/0190383 A1 * | 8/2007 | Mogi et al. | 429/32 |
| 2007/0231665 A1 * | 10/2007 | Ueda | 429/37 |
| 2008/0138682 A1 * | 6/2008 | Yamamoto et al. | 429/30 |

FOREIGN PATENT DOCUMENTS

| | | |
|---|---|---|
| JP | 8-250130 A | 9/1996 |
| JP | 2001-522522 A | 11/2001 |
| JP | 2002-542591 A | 12/2002 |
| JP | 2003-017092 A | 1/2003 |
| JP | 3559246 B2 | 8/2004 |
| WO | 98/50973 A1 | 11/1998 |
| WO | 00/63992 A1 | 10/2000 |

* cited by examiner

FUEL CELL

TECHNICAL FIELD

The present invention relates to a fuel cell, and, more particularly to a fuel cell that has the structure in which a plurality of fuel cell units is stacked.

BACKGROUND ART

A fuel cell system is a prospective cell because an energy amount that can be supplied per volume is likely to be nearly several times to ten times as large as that of the cell in the past and, by continuously supplying fuel to the fuel cell system, small electron equipment such as a cellular phone and a notebook PC can be continuously used for a long time.

In a fuel cell unit, an electrolyte membrane (MEA) in which a fuel electrode having a catalyst and an oxidizer electrode having a catalyst are formed on surfaces opposed to each other of the electrolyte membrane.

Fuel such as a hydrogen gas stored in a hydrogen occluded alloy tank or the like is supplied to the fuel electrode side and, on the other hand, an oxidizer such as oxygen is supplied to the oxidizer electrode side. These reactors are caused to electrochemically react with each other via the electrolyte membrane to generate electric power.

A theoretical voltage in a pair of electrolyte membranes (MEAs) is about 1.23 V. On the other hand, in a normal operation state, the electrolyte membranes are often used at about 0.7 V.

Therefore, when a higher electromotive force is required, a plurality of fuel cell units is stacked to form a fuel cell stack, whereby the respective cells are electrically arranged in series and used.

In the past, whereas the plurality of fuel cell units is stacked to form a fuel cell in a stack structure as described above, Japanese Patent No. 03559246 discloses that a fuel cell is formed as described below.

A cylindrical fuel cell unit employing a porous oxygen flow path plate in an oxidizer electrode in order to efficiently take oxygen in the air into the oxidizer electrode is used, a plurality of the fuel cell units is stacked in series, the center of the fuel cell units is tightened by a bolt to form a fuel cell in a stack structure.

However, in the technique disclosed in Japanese Patent No. 03559246, in stacking oxygen flow path plates of the respective cells as elastic porous members to form the fuel cell stack, in order to maintain electrical conductivity and seal a flow path of the fuel, it is necessary to apply a binding pressure equal to or larger than a fixed pressure by tightening the bolt. On the other hand, when the applied binding pressure is too large, the porous oxygen flow path plates are likely to be excessively compressed and obstruct the flow of oxygen. Therefore, fine adjustment by tightening of the bolt is necessary. However, since management of the fine adjustment is difficult, an increase in cost during manufacturing is caused.

DISCLOSURE OF THE INVENTION

The present invention is directed to a fuel cell in which a fuel cell stack can be stably bound, the supply of fuel and electrical conduction of respective cells can be performed surer, and stable power generation is possible and electron equipment employing the fuel cell.

The present invention is directed to a fuel cell comprising a fuel cell stack formed by stacking a plurality of fuel cell units having a fuel electrode and an oxidizer electrode, the oxidizer electrode having, in a plane orthogonal to a stacking direction of the fuel cell units, an elastic member that is arranged in parallel to a rigid supporting member and has an electrical conductivity.

The rigid supporting member can have binding sections for binding the fuel cell stack formed by stacking the plurality of the fuel cell units.

The rigid supporting member can have a fuel flow path for supplying fuel in the plurality of stacked fuel cell units.

The elastic member is formed of a porous material. The rigid supporting member can be formed in a concave shape and integrated with the elastic member provided in the concave shape. The rigid supporting member can be formed of a conductive material and the fuel electrode is formed in a surface opposite to a contact surface with the elastic member in the rigid supporting member.

The oxidizer electrode can be comprised of an oxidizer electrode diffusion layer having air-permeability and the elastic member which are stacked up.

The oxidizer electrode can be adapted to be capable of taking in air from a side thereof.

The present invention is directed to an Electron equipment, comprising the fuel cell in a casing and having an air hole for taking in air in the casing.

According to the present invention, in stacking the plurality of fuel cell units to form the fuel cell stack, with the effect of a spacer realized by the rigid supporting member, the thickness of the respective fuel cell units can be specified to be fixed and a compression amount of the elastic member can be fixed. As a result, electrical conduction of the respective fuel cell units becomes surer and stable power generation can be performed.

According to the present invention, since the fuel cell in which stable power generation is possible, it is possible to stabilize operations of the electron equipment.

Further features of the present invention will become apparent from the following description of exemplary embodiments with reference to the attached drawings.

BEST MODES FOR CARRYING OUT THE INVENTION

Best modes for carrying out the present invention are described next according to the following embodiments.

(First Embodiment)

In a first embodiment, a fuel cell to which the present invention is applied is described.

Figure 1:
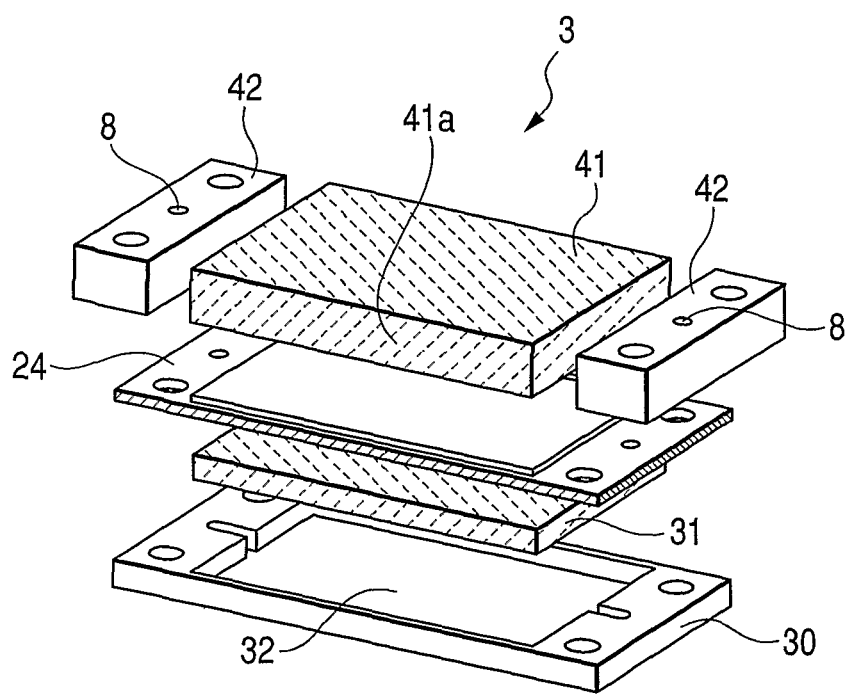
FIG. 1 is a schematic disassembled perspective view for describing a fuel cell unit according to a first embodiment of the present invention.

A disassembled perspective view of a fuel cell unit according to this embodiment is illustrated in FIG. 1.

Figure 2:
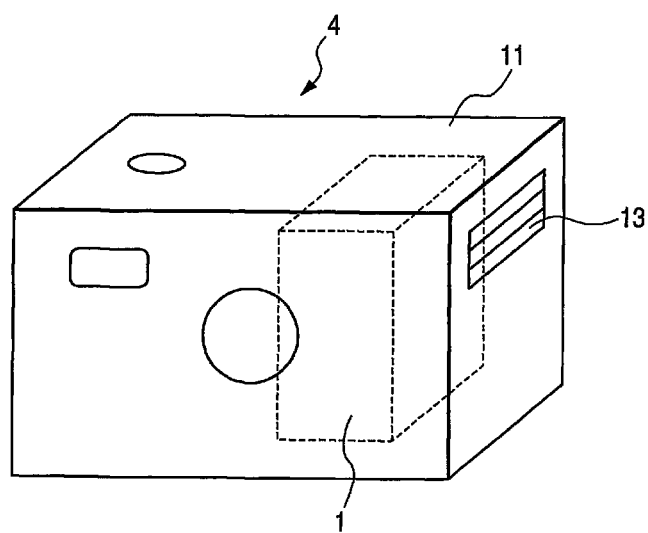
FIG. 2 is a schematic diagram of electron equipment constituted by incorporating, in an electron equipment casing, a fuel cell system including a fuel cell stack formed by stacking a plurality of the fuel cell units according to the first embodiment of the present invention.

A schematic diagram of electron equipment constituted by incorporating, in an electron equipment casing, a fuel cell system including a fuel cell stack formed by stacking a plurality of the fuel cell units according to this embodiment is illustrated in FIG. 2.

Figure 3:
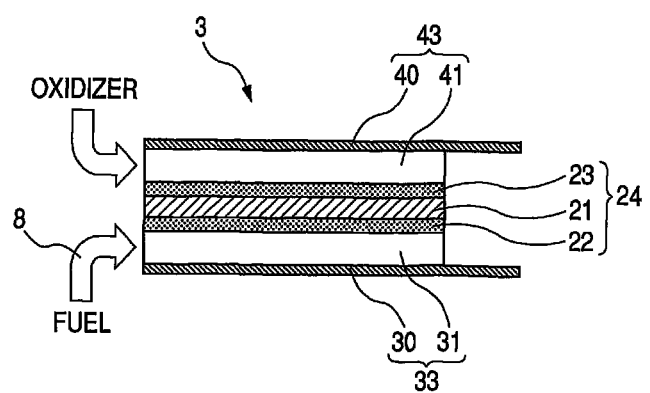
FIG. 3 is a diagram for describing a basic structure of the fuel cell unit according to the first embodiment of the present invention.

A diagram for describing a basic structure of the fuel cell unit according to this embodiment is illustrated in FIG. 3.

Figure 4:
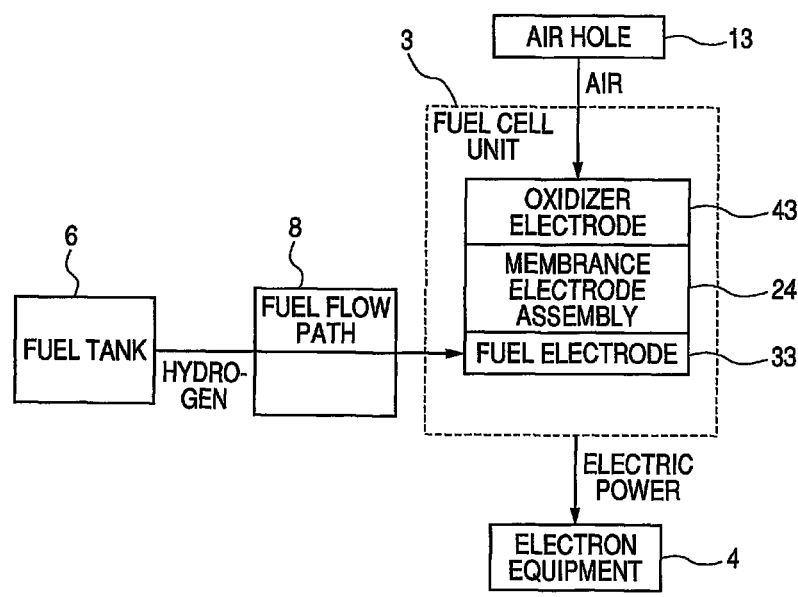
FIG. 4 is a schematic diagram for describing the fuel cell system according to the first embodiment of the present invention.
Figure 5:
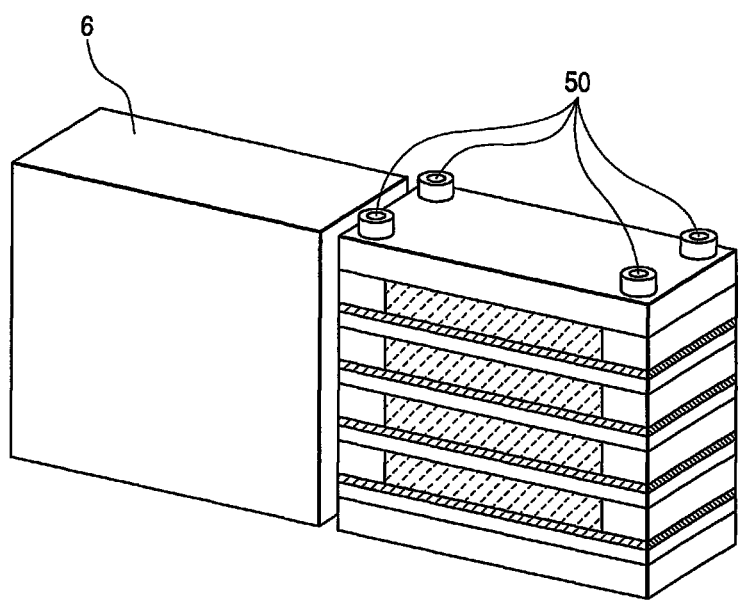
FIG. 5 is a schematic perspective view for describing the structure of the fuel cell stack according to the first embodiment of the present invention.

A schematic diagram for describing the fuel cell system according to this embodiment is illustrated in FIG. 4.

In FIGS. 1 to 4, reference numeral 1 denotes a fuel cell system; 3, a fuel cell unit; and 4, electron equipment.

Reference numeral 6 denotes a fuel tank; 8, fuel flow paths; 11, an electron equipment casing; and 13, an air hole.

Reference numeral 21 denotes a polymer electrolyte membrane; 22, a fuel electrode catalyst layer; 23, an oxidizer electrode catalyst layer; and 24, a membrane electrode assembly.

Reference numeral 30 denotes a fuel electrode collector; 31, a fuel electrode diffusion layer; 32, a fuel electrode chamber; and 33, a fuel electrode. Reference numeral 40 denotes an oxidizer electrode collector; 41, an oxidizer electrode diffusion layer; 42, rigid supporting members; and 43, an oxidizer electrode.

In the fuel cell according to this embodiment, a fuel cell stack formed by stacking a plurality of the fuel cell units 3 including a structure unit illustrated in FIG. 1 is incorporated in the electron equipment casing 11 as illustrated in FIG. 2.

The air hole 13 for supplying the air to the fuel cell system 1 according to this embodiment described later as an oxidizer is provided in the casing 11 of the electron equipment 4.

A basic structure of the fuel cell unit 3 according to this embodiment is described using FIG. 3.

Hydrogen stored in a hydrogen occluded alloy fuel tank described later is supplied to the fuel electrode catalyst layer 22 through the fuel flow paths 8.

On the other hand, the oxidizer is supplied to the oxidizer electrode catalyst layer 23. The oxidizer is usually the air, oxygen, or the like.

In particular, when the air is used as the oxidizer, the air is supplied from the air hole 13 provided in the electron equipment casing 11 by a natural diffusion or blowing unit such as a fan.

Instead of supplying the oxidizer from the air, the oxidizer may be supplied from a tank in which the oxidizer is stored.

A case in which hydrogen is used as the fuel and the air is used as the oxidizer in this embodiment is hereinafter described. The same holds true in the respective embodiments described below.

The fuel electrode catalyst layer 22 and the oxidizer electrode catalyst layer 23 are stacked on both surfaces of the polymer electrolyte membrane 21 to form the membrane electrode assembly 24.

As a material of the polymer electrolyte membrane 21, any material having ion conductivity and a gas barrier property can be used. In particular, a perfluoro sulfonic proton-exchange resin membrane is desirable.

The membrane electrode assembly 24 is manufactured as described below.

First, catalyst support particles such as platinum black or platinum support carbon, a polymer electrolyte solution, and an organic solvent such as isopropyl alcohol are mixed to produce a catalyst ink. Next, a film of this catalyst ink is formed on a polymeric film of polytetrafluoro-ethylene or the like, a conductive porous carbon electrode substrate, or the like by a spray coating method, a screen printing method, a doctor blade method, or the like to manufacture a catalyst layer. Next, the obtained catalyst layer is compression-bonded to both surfaces of the polymer electrolyte membrane with a side of the catalyst layer on which the catalyst is supported set on an inner side. Consequently, a membrane catalyst assembly can be obtained.

The fuel electrode 33 and the oxidizer electrode 43 are arranged across the membrane electrode assembly 24 to form the fuel cell unit 3.

In the fuel cell 33, the fuel (hydrogen) is transmitted through the fuel electrode diffusion layer 31 formed of a porous air-permeable conductive member and reaches the fuel electrode catalyst layer 22. Then, ionization reaction is caused by a function of the catalyst included in the fuel electrode catalyst layer 22 and ions (protons) and electrons are generated. The generated ions (protons) pass through the polymer electrolyte membrane 21 by diffusing.

The electrons generated in the fuel electrode catalyst layer 22 are extracted from the fuel electrode collector 30 of the fuel electrode 33, guided to the oxidizer electrode collector 40 of the oxidizer electrode 43 through the electron equipment 4, and used as electric power in a process of being guided to the oxidizer electrode collector 40.

In the oxidizer electrode 43, the oxidizer (the air) is transmitted thorough the oxidizer electrode diffusion layer 41 formed of the porous air-permeable conductive member and reaches the oxidizer electrode catalyst layer 23. The ions (the protons), the oxidizer (the air), and the electrons, which have passed through the polymer electrolyte membrane 21, are combined by the function of the catalyst included in the oxidizer electrode catalyst layer 23 and water is generated.

The fuel cell stack formed by stacking a plurality of the fuel cell units according to this embodiment is described.

Figure 8:
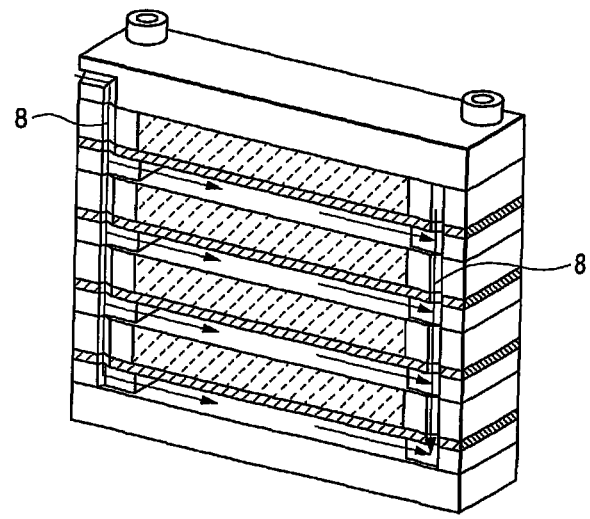
FIG. 8 is a schematic diagram illustrating an A-A section in FIG. 7 for describing the structure of the fuel cell stack according to the first embodiment of the present invention.

Diagrams for describing the structure of the fuel cell stack according to this embodiment are illustrated in FIGS. 5 to 10. FIG. 8 is a diagram illustrating an 8-8 section in FIG. 7.

In FIGS. 5 to 10, reference numeral 2 denotes a fuel cell stack; 7, a coupler; 50, stack bolts; 51, bolt holes; and 52, end plates.

Figure 9:
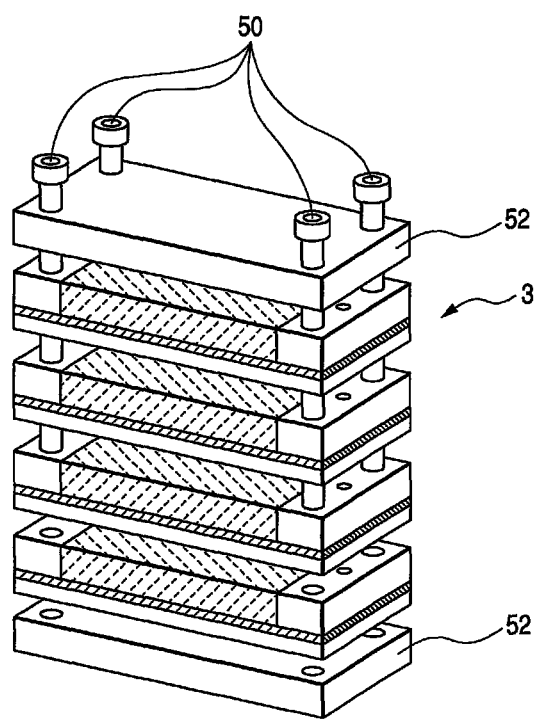
FIG. 9 is a schematic perspective view illustrating the fuel cell stack according to the first embodiment of the present invention.
Figure 10:
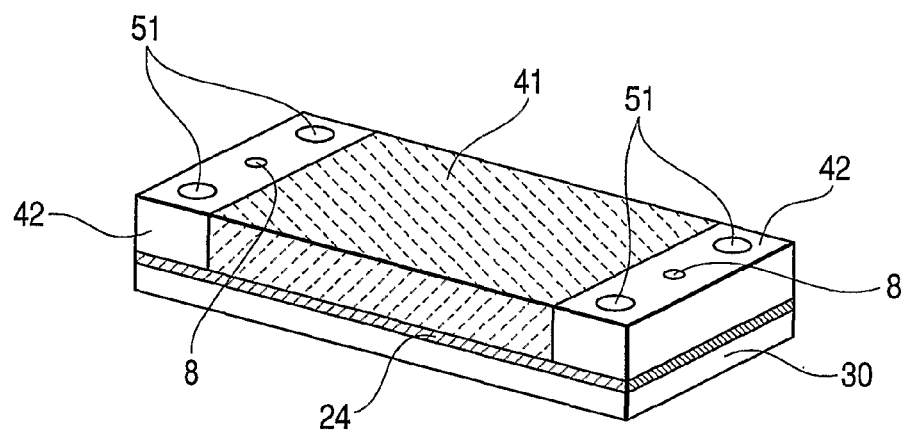
FIG. 10 is a schematic perspective view illustrating the fuel cell unit according to the first embodiment of the present invention.

The fuel cell stack 2 according to this embodiment is formed by connecting a plurality of the fuel cell units 3 in series according to a load of the electron equipment (in this embodiment, an example in which four units are connected is described). The fuel cell units 3 have the bolt holes 51 and the fuel flow paths 8, respectively. As illustrated in FIG. 9, the fuel cell units 3 are stacked and held between end plates 52.

The stack bolts 50 are inserted through the holes 51 and bound, whereby the respective fuel cell units 3 are electrically connected in series and the fuel electrode chambers 32 among the fuel cell units 3 are connected by the fuel flow paths 8. In order to prevent leakage of the fuel, it is desirable to appropriately insert seal members among the components according to a type of the fuel.

In the structure in which the fuel cell units 3 are stacked in series as described above, the oxidizer electrode collector 40 is provided in common with the fuel electrode collector 30 of the fuel cell unit 3 stacked on the oxidizer electrode 43 side to form a so-called bipolar plate.

Figure 6:
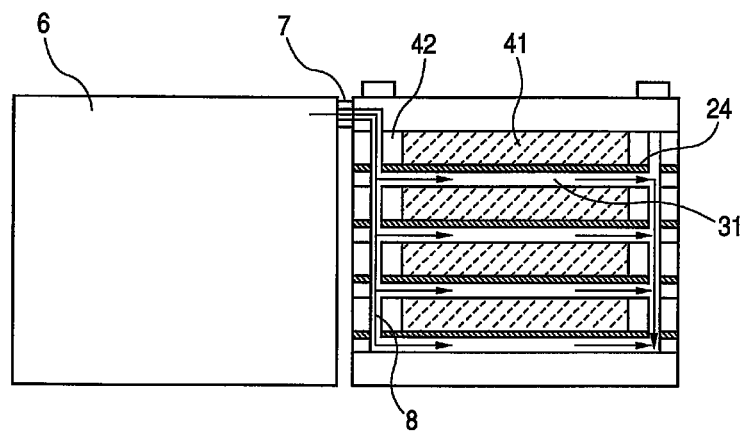
FIG. 6 is a schematic sectional view for describing the structure of the fuel cell stack according to the first embodiment of the present invention.
Figure 7:
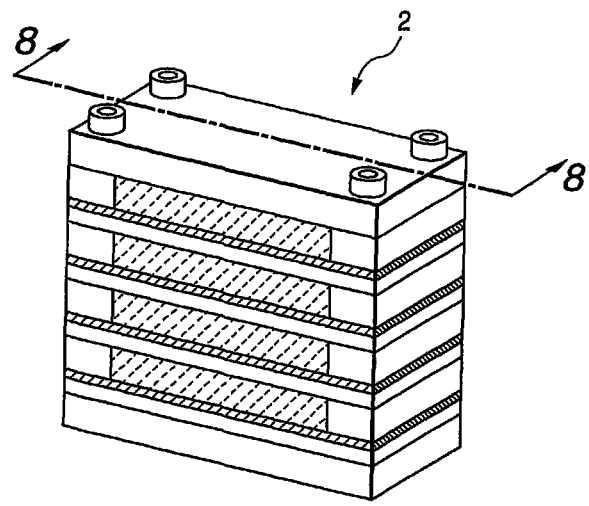
FIG. 7 is a schematic perspective view for describing the structure of the fuel cell stack according to the first embodiment of the present invention.

In this embodiment, as illustrated in FIG. 6, the fuel tank 6 is connected to the fuel flow paths 8 of the fuel cell stack 2 through the coupler 7.

As indicated by arrows in FIG. 6, the hydrogen as the fuel is supplied through the fuel flow paths 8 of the fuel cell units 3.

As the fuel tank 6, a hydrogen occluded alloy such as $LaNi_5$ that reversibly occludes and discharges hydrogen is filled in a container made of a metal material such as aluminum or duralumin having high thermal conductivity.

As hydrogen is consumed in the fuel cell stack 2, hydrogen occluded in the hydrogen occluded alloy in the fuel tank 6 is discharged and supplied to the fuel electrode catalyst layers 22 through the fuel electrode diffusion layers 31 of the fuel cell units 3.

Since hydrogen discharge reaction of the hydrogen occluded alloy at this point is endothermic reaction, according to the discharge of hydrogen, the temperature in the fuel tank falls (in the hydrogen occluded alloy fuel tank 6 according to this embodiment, depending on a load of the electron equipment, temperature falls about 10° C. in hydrogen discharge under the room temperature).

The air as the oxidizer is supplied to the oxidizer electrode diffusion layers 41 of the fuel cell units 3 through the air holes 13, the combination reaction of hydrogen and oxygen occurs, and electric power is supplied to the connected electron equipment.

The specific structure of the fuel cell unit 3 according to this embodiment is described more in detail using FIG. 1.

The fuel cell unit 3 according to this embodiment includes the fuel electrode collector 30, the fuel electrode diffusion layer 31, the membrane electrode assembly 24, the oxidizer electrode diffusion layer 41, and the rigid supporting members 42.

Here, the fuel electrode collector 30 in the fuel electrode 33 is gold-plated to conductive metal such as stainless steel. The fuel electrode chamber 32 is provided in a position corresponding to the fuel electrode catalyst layer 22. The fuel electrode diffusion layer 31 of an air-permeable conductive member is housed in the fuel electrode chamber 32.

The oxidizer electrode 43 has both the oxidizer electrode diffusion layer 41 as an elastic member and the rigid supporting members 42 in a plane orthogonal to the stacking direction of the fuel cell units 3.

The oxidizer electrode diffusion layer 41 is formed of a porous material having air permeability, electrical conductivity, and elasticity. A side 41a of the oxidizer electrode diffusion layer 41 not facing the rigid supporting members 42 is exposed to the atmosphere and the air can be taken in.

As described above, since the oxidizer electrode diffusion layer 41 is formed of the porous material and has air permeability, the oxidizer electrode diffusion layer 41 takes in the air from the outdoor air and supplies the air to the oxidizer electrode catalyst layer 23. The combination reaction of hydrogen and oxygen occurs.

Since the oxidizer electrode diffusion layer 41 is formed of the conductive material and has elasticity, when the fuel cell units 3 are bound, a pressure in the stacking direction is applied to the oxidizer electrode diffusion layer 41. As a result, the oxidizer electrode diffusion layer 41 is compressed. The oxidizer electrode diffusion layer 41 comes into contact with the fuel electrode collector 30 and the membrane electrode assembly 24 on both the surface with a predetermined contact pressure. The respective fuel cell units 3 are electrically connected in series.

As the material having air permeability, electrical conductivity, and elasticity in this way, foam metal obtained by making stainless steel, nickel, chrome, or the like porous, carbon cloth or carbon paper formed of a carbon material, and the like can be used independently or in combination.

The rigid supporting members 42 are arranged in positions corresponding to binding sections where the fuel cell units 3 are bound by inserting the stack bolts 50 through the bolt holes 51, respectively.

The rigid supporting members 42 are formed of a material having high rigidity. The rigid supporting members 42 can fix the thickness of the respective fuel cell units 3 by functioning as the binding sections of the stack bolts 50 during binding and regulate a compression amount of the oxidizer electrode diffusion layer 41 as the elastic member to a predetermined value.

Consequently, the thickness of the respective fuel cell units 3 is specified simply by tightening the stack bolts 50 by a predetermined amount, fine adjustment of a tightening pressure is unnecessary, and the fuel cell units 3 can be stably bound.

The fuel flow paths 8 are formed in the rigid supporting members 42. Thus, deformation of the fuel flow paths 8 can be suppressed during binding and positional deviation thereof can be prevented. Thus, hydrogen can be stably supplied.

As a material of the rigid supporting members 42, metal such as stainless steel, ceramic, plastic (engineering plastic excellent in a mechanical characteristic), and the like can be used.

The compression amount (the contact pressure) of the oxidizer electrode diffusion layer 41 can be specified by adjusting a difference between the thickness of the oxidizer electrode diffusion layer 41 and the thickness of the rigid supporting members 42. Thus, the compression amount can be easily adjusted and stable electrical conductivity can be obtained.

As described above, according to this embodiment, the oxidizer electrode has the elastic member having electrical conductivity, which is arranged in parallel with the rigid supporting members, in the plane orthogonal to the stacking direction of the fuel cell units. Thus, a fuel cell that is capable of stably generating electric power can be provided.

The contact pressure for obtaining the electrical conductivity of the fuel cell units 3 is generated and controlled in the oxidizer electrode diffusion layer 41 as the elastic member and the thickness of the fuel cell units 3 during binding is specified by the rigid supporting members 42. Thus, the fuel cell units 3 can be stably bound and a fuel cell that is capable of stably generating electric power can be realized.

Since the binding sections are provided in the rigid supporting members, a fuel cell stack can be more stably formed.

Moreover, since the fuel flow paths are provided in the rigid supporting members, fuel can be stably supplied.

Since the elastic member is formed of the air-permeable material, oxygen can be supplied to the oxidizer electrode catalyst layer.

Moreover, since the elastic member is formed of the conductive material, a fuel cell stable in electrical connection can be provided.

It is possible to stabilize operations of electron equipment by using the fuel cell of the present invention capable of stably generating electric power.

As described above, the "elastic member" and the "rigid supporting members" in the present invention are distinguished in functions thereof. The elastic member and the rigid supporting members are not limited by coefficients of elasticity as physical property values of materials of the respective members.

(Second Embodiment)

In a second embodiment, an example of the structure of a form different from that in the first embodiment is described.

Figure 11:
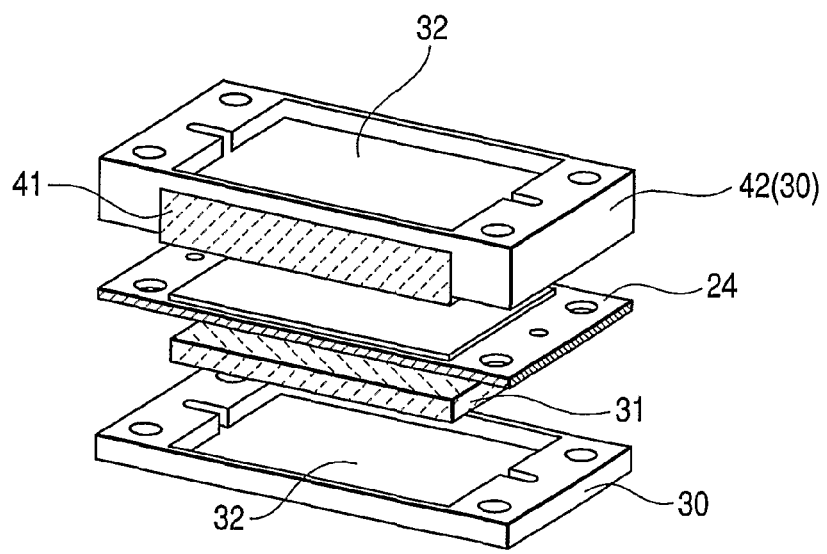
FIG. 11 is a diagram for describing a fuel cell unit according to a second embodiment of the present invention and is a schematic disassembled perspective view illustrating an example of the structure of a fuel cell unit in which a supporting member is formed in a concave shape and the supporting member and a cathode diffusion layer are integrated.
Figure 12:
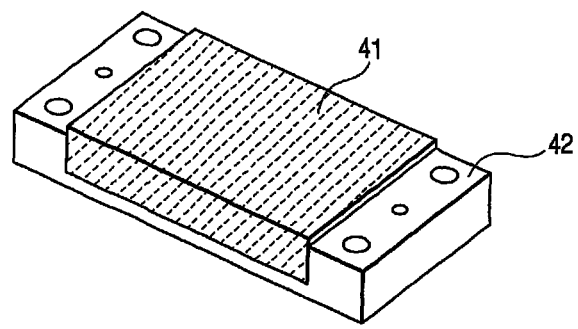
FIG. 12 is a diagram for describing the fuel cell unit according to the second embodiment of the present invention and a schematic perspective view illustrating a state of integration of the supporting member and an oxidizer electrode diffusion layer.

FIG. 11 is a schematic disassembled perspective view illustrating an example of the structure of a fuel cell unit in which the rigid supporting member 42, the oxidizer electrode collector 40, and the fuel electrode collector 30 are integrated and formed in a concave shape as a whole, the oxidizer electrode diffusion layer 41 is provided in the concave shape, and the rigid supporting member 42 and the oxidizer electrode diffusion layer 41 are integrated. A schematic perspective view viewed from the oxidizer electrode diffusion layer 41 side is illustrated in FIG. 12 in order to illustrate a state of integration of the rigid supporting member 42 and the oxidizer electrode diffusion layer 41 in this embodiment. By adopting such a structure, adjustment of the compression amount of the oxidizer electrode diffusion layer 41 is facilitated and, at the same time, the number of components can be reduced and a reduction in cost can be realized.

The rigid supporting member 42 is formed of a conductive material and the fuel electrode chamber 32 is formed in a surface opposite to a contact surface of the oxidizer electrode diffusion layer 41. Thus, the number of components can be further reduced.

By adopting such a structure, the rigid supporting member 42 and the fuel electrode collector 30 of the fuel cell units 3 stacked thereon can be provided in common to form a so-called bipolar plate. The number of components can be reduced.

(Third Embodiment)

In a third embodiment, an example of the structure in which an elastic member is stacked on an oxidizer electrode diffusion layer separately from the oxidizer electrode diffusion layer is described.

Figure 13:
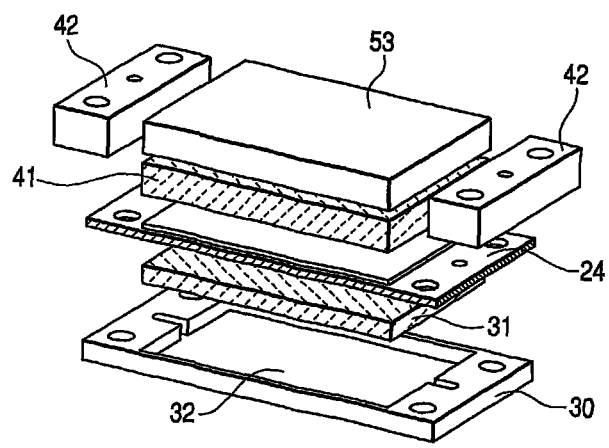
FIG. 13 is a diagram for describing a fuel cell unit according to a third embodiment of the present invention and is a schematic disassembled perspective view illustrating an example of the structure in which an elastic member is stacked on the oxidizer electrode diffusion layer separately from the oxidizer electrode diffusion layer.

A diagram for describing the example of the structure in this embodiment is illustrated in FIG. 13.

In the first embodiment, the example of the structure in which the oxidizer electrode diffusion layer 41 is used as the elastic member is described. In this embodiment, as illustrated in FIG. 13, a structure in which an elastic member 53 is stacked on the oxidizer electrode diffusion layer 41 separately from the oxidizer electrode diffusion layer 41 is adopted.

In such a structure of this embodiment, the effect same as that in the first embodiment is obtained.

Moreover, according to the structure of this embodiment, since air permeability is unnecessary in the elastic member 53, a material having a high spring property, having less plastic deformation, and having a stable coefficient of elasticity is used. Specifically, rubber imparted with electrical conductivity by adding a conductive material such as carbon or metal, a mold spring of a metal spring, and the like can be used and a more stable contact pressure can be obtained.

Since the oxidizer electrode diffusion layer 41 is not required to have elasticity, a material having high air permeability can be selected and efficiency of oxygen intake can be improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-330262, filed Dec. 7, 2006, which is hereby incorporated by reference in its entirety.

The invention claimed is:

1. A fuel cell comprising a fuel cell stack formed by stacking a plurality of fuel cell units having a fuel electrode and an oxidizer electrode, the oxidizer electrode having an elastic member that is electrically conductive,
    wherein the elastic member is arranged such that at least a part of its first side surface faces a rigid supporting member,
    wherein the rigid supporting member has a hole therethrough suitable for accommodating a fastening bolt,
    wherein a side surface of an oxidizer electrode diffusion layer is exposed to atmosphere to allow intake of atmospheric air, and
    wherein the side surface of the oxidizer electrode diffusion layer and the first side surface of the elastic member are surfaces along a stacking direction of the fuel cell units.

2. The fuel cell according to claim 1, wherein the rigid supporting member has binding sections for binding the fuel cell stack formed by stacking the plurality of the fuel cell units.

3. The fuel cell according to claim 1, wherein the rigid supporting member has a fuel flow path for supplying fuel in the plurality of stacked fuel cell units.

4. The fuel cell according to claim 1, wherein the elastic member is formed of a porous material.

5. A fuel cell comprising a fuel cell stack formed by stacking a plurality of fuel cell units having a fuel electrode and an oxidizer electrode, the oxidizer electrode having an elastic member that is electrically conductive and an oxidizer electrode diffusion layer that is air-permeable,
    wherein the oxidizer electrode diffusion layer and the elastic member are stacked up,
    wherein the oxidizer electrode diffusion layer is arranged such that at least a part of its first side surface faces a rigid supporting member,
    wherein the rigid supporting member has a hole therethrough suitable for accommodating a fastening bolt,
    wherein a second side surface of the oxidizer electrode diffusion layer is exposed to atmosphere to allow intake of atmospheric air, and
    wherein the first side surface of the oxidizer electrode diffusion layer and the second side surface of the oxidizer electrode diffusion layer are surfaces along a stacking direction of the fuel cell units.

6. An electronic equipment, comprising a fuel cell according to claim 1 in a casing and having an air hole for taking in air in the casing.

7. A fuel cell comprising a fuel cell stack formed by stacking a plurality of fuel cell units having a fuel electrode and an oxidizer electrode, the oxidizer electrode having an elastic member that is electrically conductive,
  wherein the elastic member is arranged such that at least a part of its first side surface faces a rigid supporting member,
  wherein the rigid supporting member has a hole therethrough suitable for accommodating a fastening bolt,
  wherein the elastic member is an oxidizer electrode diffusion layer,
  wherein a second side surface of the oxidizer electrode diffusion layer is exposed to atmosphere to allow intake of atmospheric air, and
  wherein the first side surface of the elastic member and the second side surface of the oxidizer electrode diffusion layer are surfaces along a stacking direction of the fuel cell units.

8. The fuel cell according to claim 7, wherein the rigid supporting member is formed in a concave shape and integrated with the elastic member provided in the concave shape.

9. The fuel cell according to claim 8, wherein the rigid supporting member is formed of a conductive material and the fuel electrode is formed in a surface opposite to a contact surface with the elastic member in the rigid supporting member.

* * * * *